Sept. 9, 1958 J. D. FORD 2,850,767
METHOD AND APPARATUS FOR MOLDING
COVERS UPON SHAFT MEMBERS
Filed April 14, 1955 2 Sheets-Sheet 1
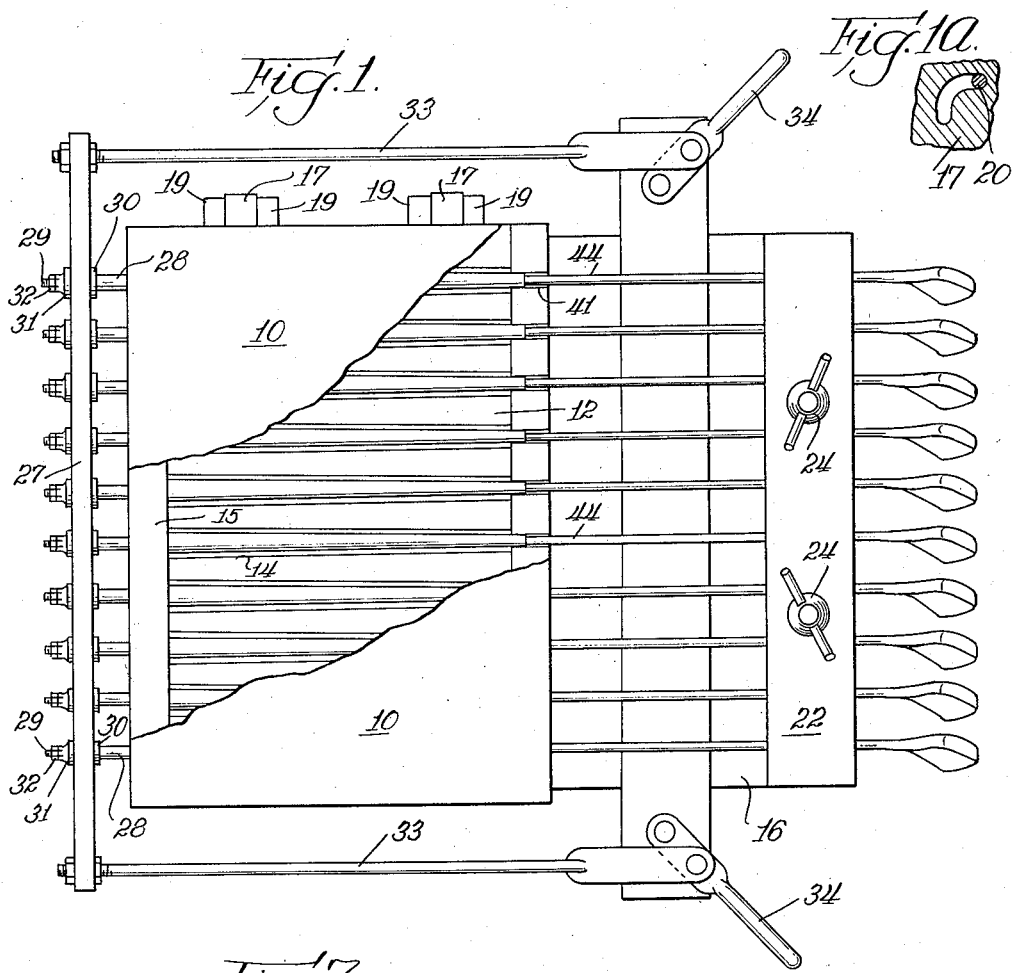
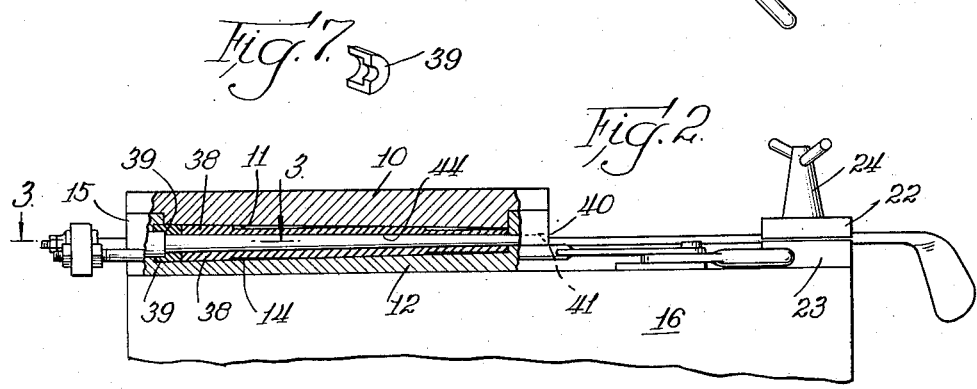
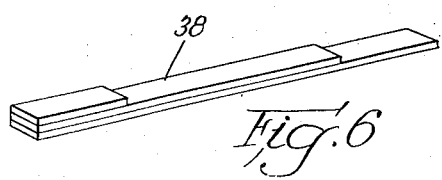
INVENTOR.
John Dwight Ford
BY
Mann, Brown and Hansmann
att'ys.

Sept. 9, 1958
J. D. FORD
2,850,767
METHOD AND APPARATUS FOR MOLDING
COVERS UPON SHAFT MEMBERS
Filed April 14, 1955
2 Sheets-Sheet 2
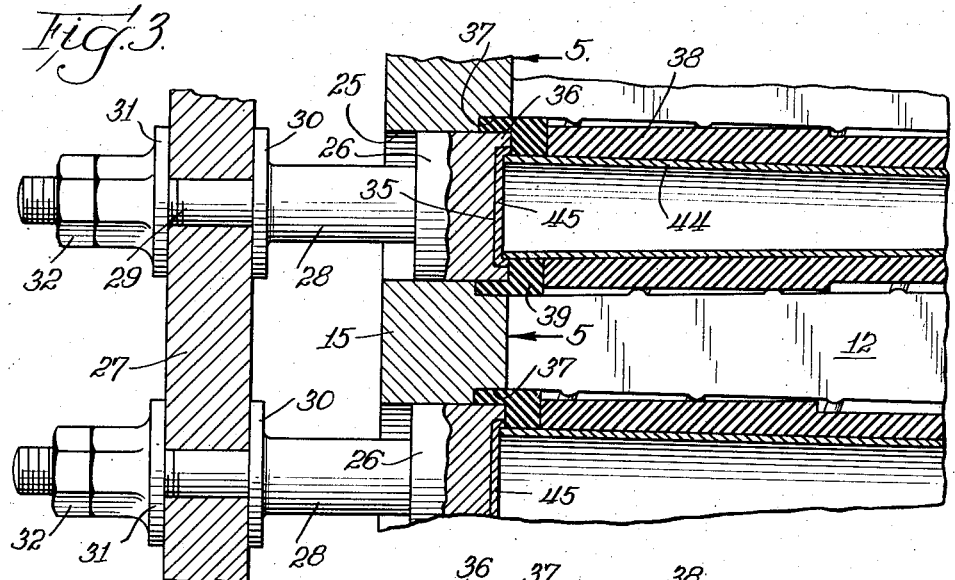
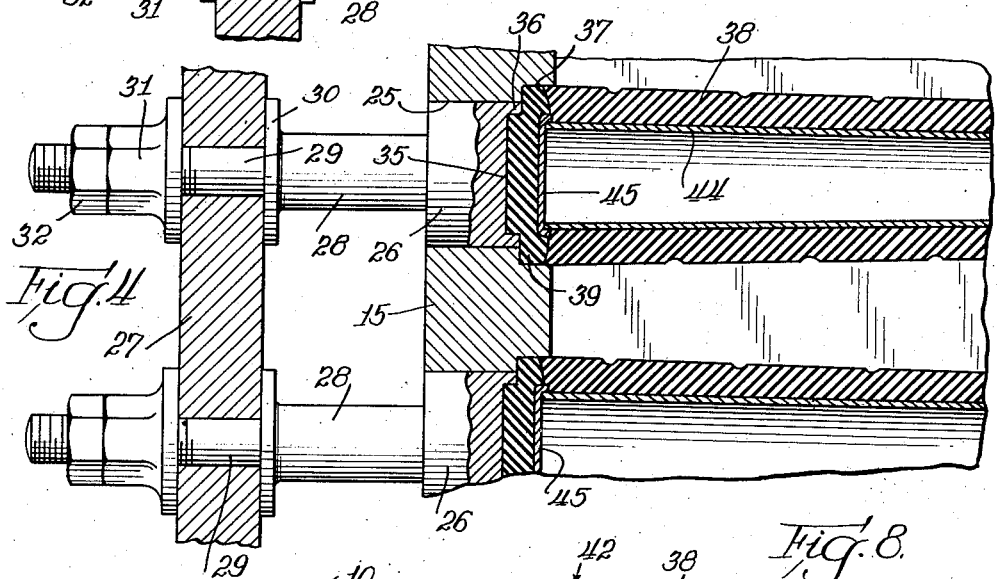
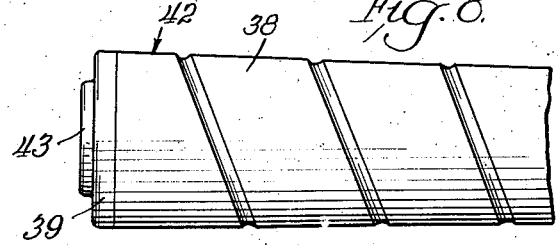
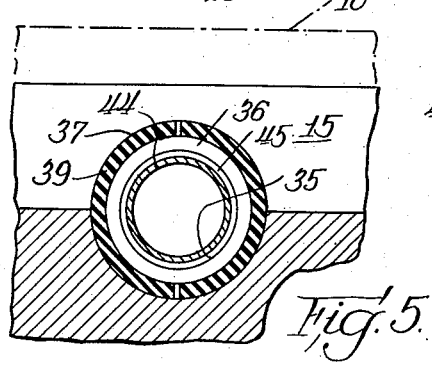
INVENTOR.
John Dwight Ford
BY
Mann, Brown and Hansmann
Attys.

United States Patent Office 2,850,767
Patented Sept. 9, 1958

2,850,767

METHOD AND APPARATUS FOR MOLDING COVERS UPON SHAFT MEMBERS

John Dwight Ford, Newark, Ohio, assignor to Burke Golf Equipment Corporation, Newark, Ohio, a corporation of Illinois Application April 14, 1955, Serial No. 501,412

3 Claims. (Cl. 18—36)

The present invention relates to a novel method and apparatus for compression molding a cover upon an end portion of a shaft member and is particularly concerned with providing handle grips on golf club shafts and similar devices.

A well balanced and symmetrically constructed shaft is essential in a high quality golf club and this uniformity is even more important in the production of matched sets of clubs. The problem, of course, arises in molding a grip on the shaft such that the grip is correctly centered relative to the shaft. This problem is particularly acute in compression molding apparatus because the mold members undergo relative movement during which time it is difficult to maintain the shaft centered relative to the mold cavity; however, due to the economics of the situation in the golf club manufacturing industry, the use of compression molding techniques is a practical necessity.

One of the important design requirements of a golf club shaft is that it be flexible and this inherent tendency to flex only further aggravates the centering problem. Fundamentally, the solution is to utilize the shaft end portion that is to be covered as one of the centering points but it is the method and means for accomplishing this that creates the practical difficulties.

It is the principal object of the present invention to provide an improved technique for compression molding a golf club grip upon a golf club shaft.

It is further proposed to provide a grip composed entirely of moldable material including the cap portion that covers the end wall of the shaft and it is proposed to accomplish this using only a standard length shaft.

Briefly this is accomplished by providing compression molding apparatus having spaced supporting and centering means adapted to contact and accurately center the shaft during the initial phase of the compression cycle. One of the centering means is adapted to contact the side surface areas of the shaft immediately adjacent the inner end of the portion to be covered and the other centering means is adapted to contact the side surface areas immediately adjacent the cap or free end of the shaft. The centering means at the free end of the shaft is made movable relative to the mold members and after the mold material has flowed sufficiently and is, itself, capable of maintaining the free end of the shaft in a centered position, this latter centering means is withdrawn. The mold members are then fully compressed to produce a secondary flow of mold material that completely covers the free end of the shaft. During this final phase of the compression cycle the free end of the shaft is maintained centered by the mold material.

Other objects and advantages of the invention will become more apparent as the description proceeds.

In the accompanying drawings forming a part of this specification and in which like numerals are employed to designate like parts throughout the same, Fig. 1 is a plan view of the compression molding apparatus with the mold members in closed relationship and with parts being broken away;

Fig. 1A is a fragmentary sectional view of a hinge arrangement and is taken along the line 1A—1A of Fig. 1;

Fig. 2 is a fragmentary sectional view taken on the line 2—2 of Fig. 1;

Fig. 3 is a sectional view taken on the line 3—3 of Fig. 2 and illustrating the relationship of the various elements of mold material at an intermediate point in the molding process;

Fig. 4 is a sectional view taken on the line 4—4 of Fig. 3;

Fig. 5 is a sectional view similar to that of Fig. 3 and showing the relationship of the parts when the molding process has been completed;

Fig. 6 is a perspective view of one of the component elements of mold material;

Fig. 7 is a perspective view of the other component element of mold material; and Fig. 8 is a view of a shaft end having a molded grip as it appears after removal from the molding apparatus.

Referring now to the drawings, the molding apparatus comprises a top mold member 10 formed with a plurality of cavity portions 11 and a bottom mold member 12 formed with a plurality of mating cavity portions 14 to form a plurality of cavities adapted to receive the end portions of a plurality of golf club shafts. The top and bottom mold members are adapted to receive therebetween, adjacent one end, a head bar member 15 the principal purpose of which is to assist in centering the golf club shafts. Portions of the head bar also serve as wall portions of the cavities during certain phases of the molding process.

In the arrangement shown, the bottom mold member is fixedly supported on a main frame 16 and is connected in hinged relationship with the top mold member. For this purpose the bottom mold member is provided with a hinge lug 17 having a bayonet type slot 18 extending upwardly and outwardly relative to the mold members. The upper mold member is formed with spaced lug portions 19 carrying a hinge pin 20 therebetween, that is adapted for cooperation with the bayonet slot. The arrangement is such that in their final closing movement, the top and bottom mold members approach each other in substantially flush relationship so that each cavity is subjected to substantially identical pressure conditions.

In the present invention, the molding pressures acting on the golf club shaft produce axially unbalanced forces that tend to shift the golf club shaft from left to right, as viewed in Figs. 1 and 2. To overcome this, the frame is made substantially longer than the mold members themselves and is provided with clamping facilities adapted for engagement with a shaft portion adjacent the head end of the golf club. The clamping facilities comprise upper and lower bars, designated 22 and 23, respectively, each formed with a plurality of mating grooves that are adapted to apply clamping pressures to the golf club shafts to maintain their positioning. The clamping pressures may be applied by the hand clamps 24 which are adapted for threaded engagement with the lower bar.

According to the present invention the head bar 15 is provided with a plurality of cylindrical bores 25, each adapted for communication with a corresponding mold cavity and each adapted to receive a piston 26 therein in snug fitting slidable relationship. The pistons are connected to a common actuating bar 27 and for this purpose are of progressively reduced diameter, as at 28 and 29, to telescopically receive thereon in spaced-apart relationship a pair of washers 30 and 31 and a hex nut 32. The hex nut is adapted for threaded engagement with the small diameter end of the piston. The common actuating bar 27 in turn is connected by means of a pair of driving levers 33 to a pair of pivotally mounted operating handles 34. It is contemplated that the handles will be manipulated simultaneously in order to control each piston in a substantially identical manner. Mechanical provision for such simultaneous control may be provided if desired. On their inner face the pistons are formed with a circular recess 35 that is bounded by an annular shoulder 36 the inner surface of which is adapted to engage the sides of the free end of the shaft being covered. Thus the pistons constitute cup-shaped support members.

At their cavity end the cylindrical bores 25 formed in the head bar 15 are surrounded by and merge with a plurality of annular recesses 37. These recesses decrease the resistance to flow of the cap stock by increasing the cross-sectional area of the flow path but more importantly accommodate mold material of a somewhat different characteristic adjacent the free end of the grip and insure that the cap portion of the grip will be formed of this last mentioned mold material. In the usual arrangement, the grip end of a golf club is frequently inserted in and removed from its golf bag and the cap and adjacent edge areas of the grip material are subjected to severe wear and tear. The material forming the main portion of the grip is of cork and soft rubber to provide a high degree of resiliency and hence is rather sensitive to severe wear and tear. Since the cap and adjacent cover portions are subjected to the severest wear and tear, it is preferred to employ a more durable material for these locations and the recesses 37 permit such an arrangement by storing the cap material at its position of use.

In the case of golf club shafts, the mold material for the main portion of the grip is originally in the form of a plurality of superposed layers or laminations of progressively decreasing length. A perspective view of a typical element 38 of mold material is shown in Fig. 6. As is best shown in Fig. 2, one of these elements of molding material is forced into the upper cavity portion 11 and a similar piece is forced into the lower cavity portion 12 of the mold cavity. Pure hard rubber mold material is preferred for the cap stock. As shown in Fig. 7 the cap elements 39 are in the form of arcuate segments or elements.

It has been seen that the head bar confines the rubber stock at the end of the cavity associated with the free end of the shaft. At the other end the stock is confined by means of a plurality of cooperating grooves 40 and 41 formed in the top and bottom mold members, respectively. These grooves include stock restricting edges to confine the stock adjacent this end of the cavity and in addition serve as a centering and supporting point for the shaft.

In the practice of the invention the top and bottom mold members 10 and 12 are opened and the pistons 26 are positioned relative to the head bar 15 as shown in Figs. 2 and 3. The elements of mold material are then wedged into the various cavity portions. One element of the type shown in Fig. 6 is placed in each lower cavity portion 13 and in each upper cavity portion 11. In addition one element of the type shown in Fig. 7 is combined with another such element and the two are placed in the annular recesses 37 of the head bar. The uncovered shaft members 44 which are preferably provided with a cap 45 for their open free end are then positioned with their free ends within the circular recesses 35 of the corresponding pistons 26 appropriately constructed for this purpose and are supported intermediately thereof in the lower grooves 41. The top mold member 10 may then be pivoted through a closing movement relative to the bottom mold member 12 until the two members are in flush relationship. The bayonet hinge is arranged to accommodate this pivotal movement and in addition to subsequently permit the members to be forced towards each other for substantially flush abutting contact between adjacent surfaces thereof.

The mold members are heated an appropriate amount and are placed under a sufficient initial amount of compression to cause the mold material to flow a substantial amount until it is more or less uniformly distributed about the shaft and is free of any severe pressure concentrations that would tend to cause misalignment of the shaft. It should be noted that at this stage the hard rubber semi-circular elements 39 will be far less flowable than the main elements 38 formed of cork and rubber. It is not believed necessary to render a detailed specification of the materials, pressures, and temperatures employed in this process as the novelty resides in the apparatus and sequence of operation. By suitable experimentation any person having only the usual skill of the art may readily determine the time, pressure, and temperature required to cause the stock to flow the required amount. After this initial flow of material it has been found that the material itself is capable of maintaining the shaft centered independently of the centering means provided at the free end.

Accordingly the handles 34 are actuated and retract the pistons 26 by an amount approximately corresponding to the depth of the annular recesses 37 formed in the head bar 15. After the pistons 26 are retracted, the final increment of pressure is applied to the top and bottom mold members until they actually abut against one another. This latter stage of the mold process produces a secondary flow of mold material particularly evidenced by the flow of the substantially pure, hard rubber elements 39 which surround the cap and adjacent side edges of the shaft. During this final stage the shaft is maintained centered by means of the cooperating grooves 40, 41 and by the mold material itself and the mold material is blocked from entering the shaft itself by the plug provided for this purpose. The position of the piston relative to the head bar during the final stage of compression is illustrated in Fig. 5. A fragment of the completed molded grip 42 is shown in Fig. 6 but before shipment it is preferred to sand off the knob 43 that projects above the cap cover.

It will be noted that the invention may also be practiced in certain instances without the annular recesses formed in the head bar. Such an application would be most suitable where mold material of uniform characteristic is employed throughout the mold cavity.

I claim:

1. The method of forming a resilient grip completely around the grip end of a golf club shaft which consists in supporting said grip end of the shaft and an intermediate portion of the shaft in a given axial relationship with respect to the mold cavity of a mold having separable mold parts, with the support for the grip end of the shaft being retractable through the mold along a line axially of the shaft, placing grip-forming moldable resilient material in the mold parts that define said cavity and partially closing the mold to cause the moldable material to conform generally to the shape of the mold, then retracting the end support a predetermined distance to completely free and expose the grip end of the shaft while supporting the grip end in its original axial position within the mold by the generally conformed moldable material, and then completing closure of the mold to thereby force said material around the grip end of the shaft to complete formation of the grip on the end of the shaft, while using said retractable support in its retracted position as a mold face.

2. In apparatus for molding a resilient grip completely around the grip end of a golf club shaft, the combination of a compression mold having separable mold parts defining an elongated mold cavity therebetween, which cavity, when the mold is fully closed on the grip end of the shaft, is completely enclosed and has only the size and shape of the resilient grip, said mold having a fixed mold part spanning said cavity at the end thereof occupied by the grip end of the shaft, said mold having a retractable cup-shaped support projecting into said end of the mold cavity through said fixed mold part for movement along a line axially of the shaft for telescoping engagement over the grip end of the club shaft, said support substantially filling said end of the cavity and upon retraction thereof serving as a mold face in spaced axially facing relation to the grip end of the shaft, and means for retracting said club end support to completely free and expose the entire grip end of the shaft after the mold has been partially closed against elongated elements of moldable resilient material therein, with said material having been conformed to the shape of the mold during such partial closing, whereby further closing of the mold causes the moldable material to flow along the cavity to fill the space between the mold face of said support and the end of the shaft, said retracting means including means for fixing said support at its shaft-supporting position against displacement thereof by said material during said partial closing of the mold.

3. The arrangement of claim 2 wherein said fixed part of the mold is formed with an annular recess in open communication with and surrounding said end of the mold cavity and receives arcuate segments of moldable resilient material in said recess.

References Cited in the file of this patent

UNITED STATES PATENTS

| | | |
|---|---|---|
| 2,405,329 | Ruebensaal | Aug. 6, 1946 |
| 2,434,594 | Schultz | Jan. 13, 1948 |
| 2,604,660 | Karns | July 29, 1952 |
| 2,604,661 | Karns | July 29, 1952 |